(12) United States Patent
Bohlig et al.

(10) Patent No.: US 7,302,407 B2
(45) Date of Patent: Nov. 27, 2007

(54) METHOD, SYSTEM AND COMPUTER READABLE MEDIUM FOR BROKERING THE PURCHASE AND SALE OF GLASS CULLET

(75) Inventors: James W. Bohlig, Cuttingsville, VT (US); Sean P. Duffy, Huntersville, NC (US)

(73) Assignee: Casella Waste Systems, Inc., Rutland, VT (US)

( * ) Notice: Subject to any disclaimer, the term of this patent is extended or adjusted under 35 U.S.C. 154(b) by 13 days.

(21) Appl. No.: 10/987,317

(22) Filed: Nov. 15, 2004

(65) Prior Publication Data

US 2005/0177451 A1 Aug. 11, 2005

Related U.S. Application Data

(60) Provisional application No. 60/548,887, filed on Mar. 2, 2004, provisional application No. 60/520,309, filed on Nov. 17, 2003, provisional application No. 60/520,312, filed on Nov. 17, 2003.

(51) Int. Cl.
*G06Q 30/00* (2006.01)
(52) U.S. Cl. .................................... 705/26
(58) Field of Classification Search ............ 705/26, 705/27
See application file for complete search history.

(56) References Cited

U.S. PATENT DOCUMENTS 5,350,121 A 9/1994 Vitunac et al.
5,588,598 A 12/1996 Becker et al.
5,718,737 A 2/1998 Mosch
5,950,936 A 9/1999 Bergart
6,230,521 B1 5/2001 Lehman
6,763,280 B1 7/2004 Lehman
2003/0014351 A1* 1/2003 Neff et al. ................. 705/37
2005/0108112 A1* 5/2005 Ellenson et al. ........... 705/27

FOREIGN PATENT DOCUMENTS

JP 2003192139 A * 7/2003

OTHER PUBLICATIONS

CBOT Recyclables Exchange, http://web.archive.org/19990117060911/cbot-recycle.com/index.html <retrieved via the WayBackMachine, www.archive.org> retrieved on Jun. 22, 2006. 1999 (PTO-892, Ref U, pp. 1-12 and 15-18).*
Recycled Glass Commodities Exchange, National Glass Recycling, BP-GL1-04-02, Jan. 1997. (PTO-892, Ref U, pp. 13-14).*

(Continued)

*Primary Examiner*—Matthew S. Gart
(74) *Attorney, Agent, or Firm*—Wilmer Cutler Pickering Hale and Dorr LLP

(57) ABSTRACT

Embodiments of the invention provide systems and methods for brokering the purchase and/or sale of mixed-color glass and/or cullet, optionally over a computer network. In one embodiment, the broker facilitates the purchase and/or sale of three color mixed cullet between beneficiators, MRFs and/or glass plants, in order to supply, for example, glass plants with and/or allow glass plants to purchase desired quantity and/or quality (e.g., cleanliness) of cullet.

34 Claims, 6 Drawing Sheets

OTHER PUBLICATIONS

Environmental Services: City of San Jose—Capital of Silicon Valley, 2002. "How the Sorting Works." http://www.recycleplus.org/mrf.html.

Nillumbik Shire Council, Jul. 10, 2003. "What Happens to My Recycling." http://www.nillumbik.vic.gov.au/page/page.asp?page_id=521&h=1.

Tim Goodman & Associates. Aug. 11, 2003. "Material Recovery Facilities Operational Assessment Final Report and Optimization Guide." p. 1-42.

Screening Technologies for Recycled Glass: Best Practices in Glass Recycling, http://www.cwc.org/gl_bp/gbp2-0402.html, date unknown.

Jan. 19, 2004. Waste News. *Waste News Pricing Report*. p. 22.

* cited by examiner

| Seller | |
|---|---|
| Name ~502 | |
| Location ~504 | |

FIG. 5

| Post Inventory | |
|---|---|
| Quantity <tons> ~802 | |
| Quality <% flint> ~804 | |
| Available <date/s> ~806 | |

| Sale Price | |
|---|---|
| Most Expensive ~402 | |
| Least Expensive ~404 | |
| Price/Ton ~406 | |

FIG. 4

| Delivery Date | |
|---|---|
| On <date> ~702 | |
| Between <date> ~704 | |
| And <date> ~706 | |

| Search | |
|---|---|
| Sale Price ~302 | |
| Seller ~304 | |
| Location ~306 | |
| Delivery Date ~308 | |

FIG. 3

| Location | |
|---|---|
| Within <#> miles ~602 | |
| Of <address> ~604 | |
| <city> ~606 | |
| <state> ~608 | |
| <zip> ~610 | |

FIG. 6

Contract

Order No.
9621 ~902a
6243 ~902b

Completed Order ~904

FIG. 9

Order No. 9261        Summary

Seller ~1004 _____
Quantity ~1006 _____
Quality ~1008 _____
Delivery Address ~1010 _____
Date(s) ~1012 _____

---- FOB Seller ~1014
---- FOB Buyer ~1016

Amount < ~1018 >
Status Info. ~1020
Tracking Info. ~1012

FIG. 10

METHOD, SYSTEM AND COMPUTER READABLE MEDIUM FOR BROKERING THE PURCHASE AND SALE OF GLASS CULLET

REFERENCE TO RELATED APPLICATIONS

This application claims the benefit under 35 U.S.C. § 119(e) of U.S. Provisional Application No. 60/520,309, filed Nov. 17, 2003, which is incorporated herein by reference. This application also claims the benefit under 35 U.S.C. § 119(e) of U.S. Provisional Application No. 60/520,312, filed Nov. 17, 2003, which is incorporated herein by reference. This application also claims the benefit under 35 U.S.C. § 119(e) of U.S. Provisional Application No. 60/548,887, filed Mar. 2, 2004, which is incorporated herein by reference.

BACKGROUND OF THE INVENTION

1. Field of the Invention

Embodiments of the present invention generally relate to systems and methods for glass recycling and, more particularly, to brokering mechanisms related to buying and selling recycled glass.

2. Background of the Invention

Cost-effective recycling of materials such as glass has become an increasingly important issue to many businesses due, for example, to ever increasing legislative mandates at the federal, state and local levels, and the associated cost of complying therewith. In a conventional recycling process, entities typically interact with each other on an individual and/or ad hoc basis.

FIG. 1, generally at 100, shows entities within a recycling process that include originator points 110a-n, collectors 120a-n, material recovery facilities (MRFs) 130a-n, beneficiators 140a-n, glass plants 150a-n, and bottlers 160a-n. In FIG. 1, the lines connecting the various entities represent both communication (e.g., electronic/computerized and/or telephonic) that may take place between the various entities, as well as a physical flow of goods. For example, MRF 130c may communicate with and/or deliver goods, for example, to beneficiator 140g and/or glass plant 150b.

Originator points 110a-n are areas where a waste originator can deposit waste. Originator points 110a-n may include, for example, community drop-off points and/or reverse vending sites. Originator points 110a-n may perform the function of separating waste into recyclables and non-recyclables. Waste originators may include commercial generators (e.g., a restaurant generating wine bottles and/or beer cans), as well as residential generators.

Collectors 120a-n receive solid waste from originator points 110a-n, and generally perform functions such as separating, for example, paper from commingled plastics, glass and/or metal objects. Collectors 120a-n can also separate recyclables into glass, paper, and plastics, and place the separated material into respective bins for collection. In addition, collectors 120a-n may also sort glass by color. Collectors 120a-n may also commingle glass, paper, plastics and metals together, as a single stream collection.

The material from collectors 120a-n is transported to a MRF 130a-n or, if the material is clean enough, directly to a beneficiator 140a-n. MRFs 130a-n provide additional cleaning and/or sorting of the material. For example, MRFs 130a-n may further sort recyclable material from non-recyclable material and/or perform a finer sort of recyclables by type, such as glass, plastics, and paper. Glass may be sorted by color (e.g., into amber, green, and flint) and/or to further remove contaminants, such as ceramics.

During the processing of recyclables, a large percentage, typically greater than 50% by weight, of the collected glass falls out and is rendered unusable due, for example, to the size of the glass pieces. Glass that is less than approximately 2.5 inches in diameter is generally undesirable because it is too small to be effectively color-sorted by hand, is difficult to color-sort optically, and is difficult to contaminant-sort. Sorting out the pieces of glass less than approximately 2.5 inches in diameter results in a large quantity of residual mixed-color glass (hereinafter, mixed cullet) that currently has limited, if any, market value. Mixed cullet of flint, amber and green glass is referred to herein as three color mixed cullet (C3MC).

Conventional MRFs 130a-n (and beneficiators 140a-n) typically amass stockpiles of mixed cullet and/or C3MC, which is typically used either as a landfill daily cover material, or is further processed, at an additional cost, so that it can be used in glassphalt (a highway paving material in which recovered ground glass replaces some of the gravel in asphalt) and/or aggregate (material such as glass, sand or small stones mixed with a binder such as cement to produce mortars and concrete). Disposal in a landfill, whether as residue or landfill cover, does not allow the glass to be re-used, and adds to the mass in landfills. Even if a MRF 130a-n or a beneficiator 140a-n utilizes optical sorting equipment that can, at additional cost, process and sort the C3MC by color, the percentage of C3MC recovered is rarely, if ever, 100%. Thus, it would be desirable if greater quantities and percentages of mixed cullet and/or C3MC that results from processing performed by MRFs 130a-n and beneficiators 140a-n could be utilized in an economically viable manner.

Once the glass has been sorted by color, MRFs 130a-n then transport the color-sorted glass and, optionally, any mixed-color glass and/or C3MC to beneficiators 140a-n for further processing. If beneficiators 140a-n have limited or no optical color-sorting capabilities, beneficiators 140a-n generally will not order and/or accept delivery of mixed-color glass and/or C3MC from MRFs 130a-n. If beneficiators 140a-n have a color sorting capability, beneficiators 140a-n can color sort the C3MC, and blend one or more sorted colors of cullet in with other (e.g., previously delivered) glass of the same color (e.g., flint, amber or green). The combined glass may then be sorted for contaminants such as organics, ceramics, and any other non-glass debris.

As a matter of economics, however, flint cullet is the only color of cullet that can generally be profitably color sorted. Although green and amber cullet can be color sorted, it typically is either discarded, or blended into flint glass in small percentages to avoid substantial or unacceptable color contamination and/or rejection by glass plants 150a-n. Thus, even if beneficiators 140a-n sort out flint cullet, a significant percentage of green and amber cullet typically remains. This presents a number of issues, including storage and eventual disposal of the mixed cullet. Thus, it would be desirable if greater quantities of mixed cullet that results from beneficiators 140a-n processing could be utilized in an economically viable manner.

Conventional glass plants 150a-n receive a quantity of color-sorted glass from beneficiators 140a-n. Existing glass, including cullet, has been used as a substitute for virgin glass raw materials at percentages up to 70%-80%. The use of recycled glass advantageously results, for example, in less energy required to produce a same quantity of glass, less pollution from the glass manufacturing process, less wear and tear and maintenance cost associated with equipment such as furnaces, and less landfill waste.

Glass plants 150*a-n* may add a percentage of color-specific glass from beneficiators 140*a-n* or MRFs 130*a-n*, which generally closely matches the color of the glass article being manufactured at glass plants 150*a-n*. The color-specific glass acts as a substitute for a portion of the required virgin glass raw materials. Once the appropriate amounts of glass from beneficiators 140*a-n* and virgin glass raw materials have been added to the batch, the glass manufacturing process proceeds as normal to produce a glass article, e.g., a glass bottle. Once the glass articles are produced, they are transported to bottlers/retailers 160*a-n*, which fill the bottles using conventional and well-known bottling techniques.

We have discovered that no single company or entity has generally integrated, physically and/or logically, at least some of the entities in system 100 in order to facilitate purchase and/or shipment of glass and/or cullet, for example, to glass plants 150*a-n*. We have determined that there are inefficiencies and lost market opportunities associated with having entities within the glass recycling process and/or industry interact with each other on an individual basis. We have also determined that facilitating market transactions may reduce the cost associated with producing glass.

We have thus discovered that no active centralized market for cullet currently exists. Therefore, each entity must negotiate for its own needs, generally on an entity-entity basis. We have further determined that if a means to increase the amount of cullet used in glass manufacturing is provided, there would be a further need to facilitate the purchase and sale of cullet between, for example, MRFs 130*a-n*, beneficiators 140*a-n*, and glass plants 150*a-n*.

SUMMARY OF THE INVENTION

In one embodiment of the present invention, a method of brokering the purchase and sale of glass cullet is provided. The method includes receiving by a broker a cullet purchase inquiry from a buyer, and providing data from the broker to the buyer, responsive to the received purchase inquiry, pertaining to cullet data that includes at least one of a quantity and price of cullet for sale from at least one seller.

In another embodiment of the present invention, a method of brokering the purchase and sale of glass cullet includes the steps of storing, with a broker, cullet data that includes at least one of a quantity and price of cullet for sale from a plurality of sellers. A buyer query is received at the broker pertaining to purchase of a quantity and price of cullet. A data repository is queried to determine if a stored quantity and price of cullet satisfies the query. Responsive to the query, at least one seller name is provided that can provide a quantity and price of cullet in accordance with the query.

Another method of brokering the purchase and sale of glass cullet in accordance with the present invention includes the steps of storing, with a broker, cullet data that includes at least one of a quantity and quality of cullet for sale from a plurality of sellers. A query is received from a buyer pertaining to purchase of a quantity and price of cullet, and a data repository is queried to determine if a stored quantity and quality of cullet satisfies the buyer query. A seller name is provided in response to the query that can provide cullet substantially in accordance with the buyer query.

In still another embodiment of the invention, a system for brokering the purchase and sale of glass cullet is provided. The system includes a broker computing device for: (i) receiving from a buyer computing device a query pertaining to at least one of a quantity and price of cullet for sale, (ii) querying a database of available cullet, and (iii) transmitting, directly or indirectly, to the buyer computing device cullet information substantially satisfying the purchase inquiry.

A further embodiment of the invention is directed to a computing device that facilitates the purchase and sale of recycled glass cullet. The computing device has at least one memory area, and at least one processor that uses the at least one software module to (i) store data pertaining to a quantity and price of cullet for sale from a plurality of sellers, (ii) receive a query pertaining to a quantity and price of cullet for sale, and (iii) access a data repository to determine if a quantity and price of cullet satisfies the query.

Yet another embodiment of the invention is directed to a computer program product residing on a computer readable medium. The computer program instructions cause a computer to store data pertaining to a quantity and price of cullet for sale from a plurality of sellers, query a data repository to determine if a stored quantity and price of cullet satisfies a buyer query pertaining to a purchase of a quantity and price of cullet, and generate, responsive to the query, a seller name that can fulfill the quantity and price of cullet.

BRIEF DESCRIPTION OF THE DRAWINGS

FIG. 3 is an exemplary screen display in accordance with the present invention that allows a user to search for cullet using various search criteria.

FIG. 4 is an exemplary screen display in accordance with the present invention that allows a user to search for cullet by sale price.

FIG. 5 is an exemplary screen display in accordance with the present invention that allows a user to search for cullet by seller.

FIG. 6 is an exemplary screen display in accordance with the present invention that allows a user to search for cullet by location.

FIG. 7 is an exemplary screen display in accordance with the present invention that allows a user to search for cullet by delivery date.

FIG. 8 is an exemplary screen display in accordance with the present invention that allows a seller to post cullet inventory for sale.

FIG. 9 is an exemplary screen display in accordance with the present invention that allows a user to search for contracts to which they are a party.

FIG. 10 is an exemplary screen display in accordance with the present invention that displays cullet order information.

DESCRIPTION OF EMBODIMENTS OF THE INVENTION

Embodiments of the present invention provide a system and method for brokering the purchase and/or sale of mixed-color glass and/or cullet. One or more embodiments of the invention can use clean or substantially clean three-color (e.g., flint, green, and amber) mixed cullet (C3MC) and associated de-coloring/coloring technology (enabling technology), as shown and described in one or more of U.S. Pat. No. 5,718,737, entitled "Method of Recycling Mixed Colored Cullet into Amber, Green, or Flint Glass," U.S. Pat. No. 6,230,521, entitled "Method of Recycling Batches of Mixed Color Cullet into Amber, Green, or Flint Glass with Selected Properties," and U.S. Pat. No. 6,763,280, entitled "Automated Process for Recycling Batches of Mixed Color Cullet into Amber, Green, or Flint Glass with Selected Properties," each of which are incorporated herein by reference. These patents generally allow the use of mixed-color glass and/or cullet at a glass plant to products glass products, such as bottles, of a specified color. Embodiments of the present invention can be used to broker the purchase and/or sale of, for example, C3MC between, for example, MRFs 130*a-n*, beneficiators 140*a-n*, and/or glass plants 150*a-n*.

Figure 1:
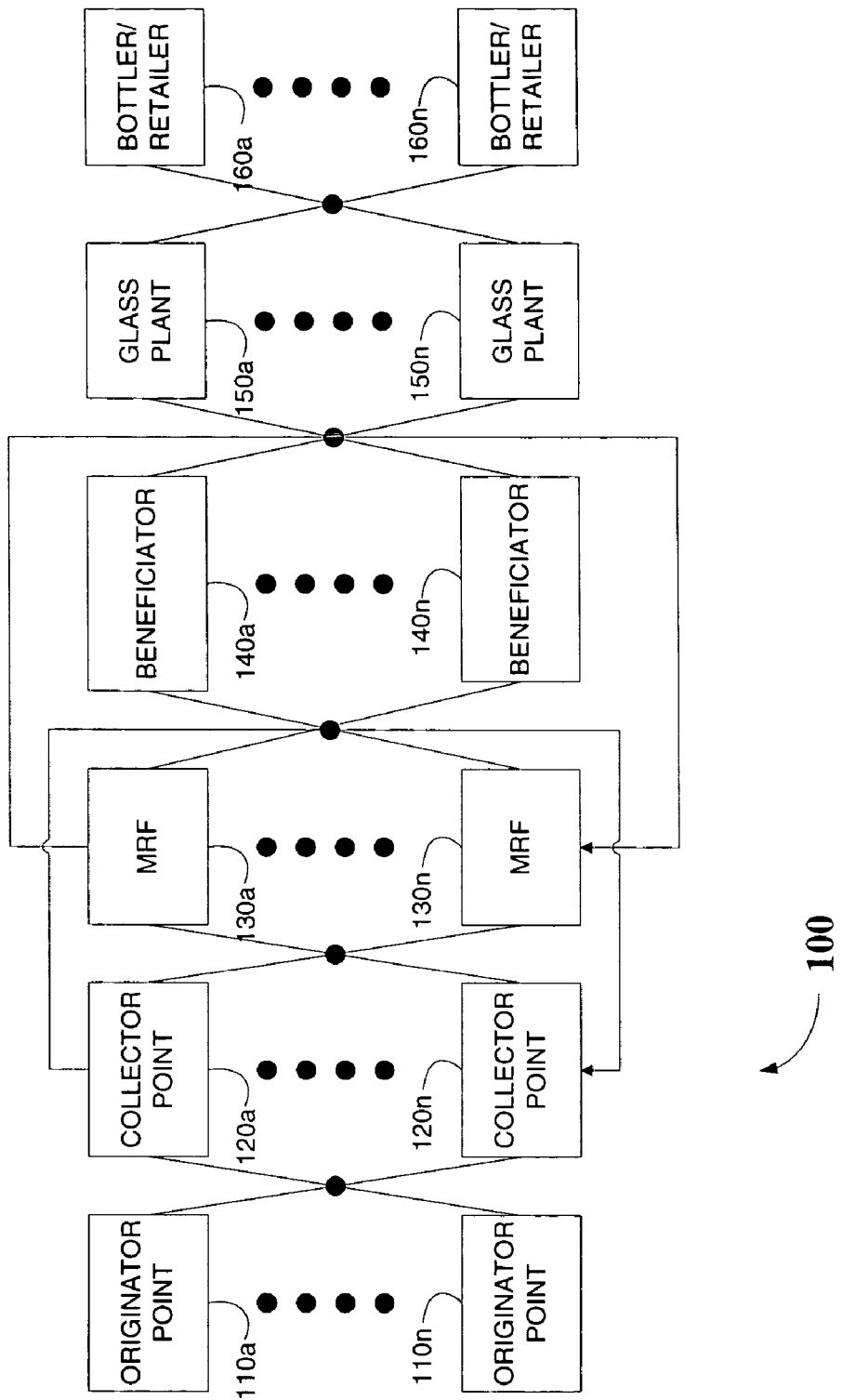
FIG. 1 is a block diagram illustrating the relationships between entities that may participate in a conventional glass recycling process.
Figure 2:
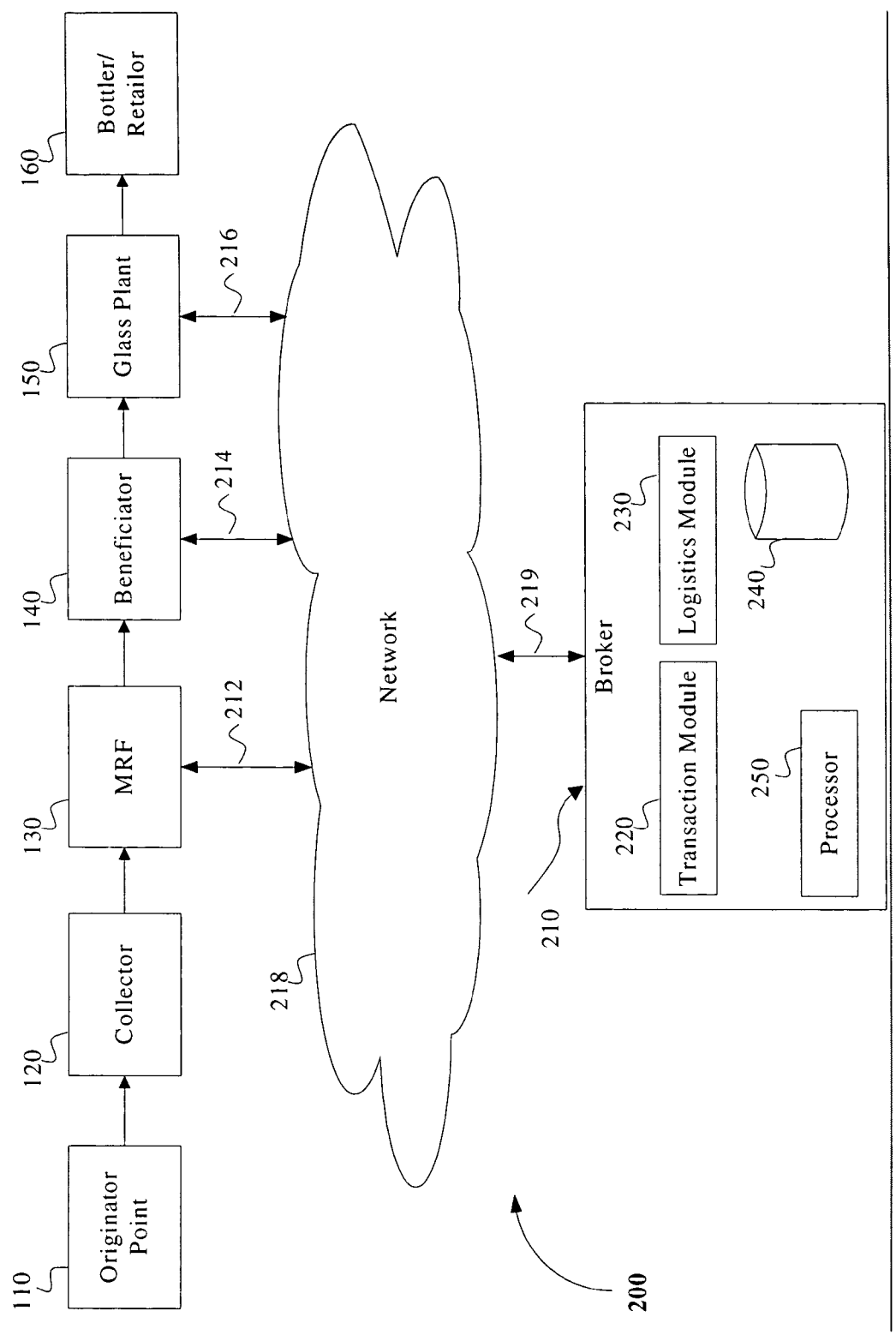
FIG. 2 is an embodiment of an exemplary glass recycling system in accordance with the present invention.

FIG. 2, generally at 200, illustrates an exemplary glass recycling system in accordance with an embodiment of the present invention. System 200 includes at least one originator point 110, at least one collector 120, at least one MRF 130, at least one beneficiator 140, at least one glass plant 150, and/or at least one bottler/retailer 160, each as described in reference to FIG. 1.

Network 218 can be, for example, a Local Area Network (LAN), Wide Area Network (WAN), the Internet, or any combination thereof. MRF 130, beneficiator 140 and glass plant 150 may respectively utilize communication links 212, 214, 216, network 218, and one or more computer systems (e.g., a personal computer (PC)) to communicate with broker 210. In turn, broker 210 can utilize network 218 and communication link 219, and one or more of communication link 212, 214, 216 to respectively communicate with MRF 130, beneficiator 140 and/or glass plant 150.

Broker 210 includes a transactions module 220, a logistics module 230, and a database 240. In an embodiment, the functionality provided by broker 210 can be implemented on a computer-based system, such as a standard general purpose computer. Broker 210 may also be partially manual, or be a manual file system with a human operator that performs and maintains records pertaining the purchase and/or sale C3MC.

Broker 210 facilitates the purchase and/or sale of, for example, two color mixed cullet (e.g., flint and amber) and/or C3MC between beneficiators 140, MRFs 130 and/or glass plants 150, in order to supply glass plants 150 with and/or allow glass plants 150 to purchase desired quantity and/or cleanliness of cullet (e.g., C3MC). Broker 210 may have expertise in the technology disclosed in U.S. Pat. Nos. 5,218,737, 6,230,521, and/or 6,763,280, and assist glass plant 150 in implementing this technology in its manufacturing operations. Individuals and/or organizations associated with broker 210 may also own and/or license intellectual property rights for the technology disclosed in U.S. Pat. Nos. 5,218,737, 6,230,521, and/or 6,763,280, and supply glass plants 150 with this technology (e.g., by providing software and/or consulting services) for using and integrating the technology into the glass manufacturing process at or associated with glass plant 150. The software, for example, generally allows glass plants 150 to use C3MC and/or other mixed cullet in existing manufacturing processes, and still achieve the desired coloring of a glass article, such as an amber bottle. Consulting services may include onsite training of glass plant 150 personnel to utilize the software, and integration of software into glass plant 150.

Transactions module 220 tracks the purchase and sale of cullet (e.g., C3MC) by MRF 130, beneficiator 140, and glass plant 150, amounts owed by (and due) the various entities, and compensation realized by broker 210 for facilitating such transactions. Standard payment mechanisms or procedures, such as Automated Clearing Houses (ACH), may be used to facilitate electronic fund transfers between MRF 130, beneficiary 140 and glass plant 150. Transaction records may be stored in a repository such as database 240, or one or more other standard software applications (e.g., a spreadsheet). Processor 250, which may be a standard central processing unit, may be used to facilitate processing operation associated with transaction module 220 and logistics module 230.

For example, a transaction between MRF 130 and broker 210 may include the sale of a specified quantity and cleanliness of two color mixed cullet and/or C3MC by MRF 130 to broker 210. A delivery date or range of acceptable delivery dates will also generally be provided in each transaction. Broker 210 may also contract with MRF 130 to provide a specified quantity and cleanliness of C3MC, on a periodic basis at a specified price or range of prices. For example, MRF 130 may sell broker 210 10,000 tons of 95% pure cullet on the first of every month, at a price of $80/ton. MRF 130 can make electronic payments to broker using the network 218, or pay in a non-electronic manner (e.g., send a check in the mail). In transactions between MRF 130 and broker 210, broker 210 will generally, but not necessarily always, assume ownership of the purchased cullet or C3MC, and arrange for a carrier to transport the cullet or C3MC from MRF 130 to glass plant 150.

Similarly, a transaction between beneficiator 140 and broker 210 may include the sale, for example, of C3MC by beneficiator 140 to broker 210. A delivery date or range of acceptable delivery dates will also generally be provided for each transaction. Broker 210 may also contract with beneficiator 140 to provide a specified quantity and cleanliness of C3MC, on a periodic basis at a specified price. For example, beneficiator 140 may sell broker 210 10,000 tons of 95% pure cullet on the first of every month, at a price of $80/ton. Broker 210 can make electronic payments to beneficiator 140 using the network 218, or pay in a non-electronic manner (e.g., send a check in the mail). In transactions between beneficiator 140 and broker 210, broker 210 will generally assume ownership of the purchased cullet or C3MC, and arrange for a carrier to transport the cullet or C3MC from beneficiator 140 to glass plant 150.

In another embodiment, as part, for example, of a licensing agreement between glass plant 150 and broker 210, optionally pertaining to the glass plants' 150 use of the technology disclosed in U.S. Pat. Nos. 5,218,737, 6,230, 521, and/or 6,763,280, glass plant 150 can purchase 3CMC directly from MRF 130 and/or beneficiator, and pay a fee to broker 210. Fees can be based, for example, on a fixed fee per ton of purchased C3MC, a fixed fee per transaction, or a fixed fee per time period (e.g., monthly). In this case, broker 210 will generally not take ownership or possession of the C3MC purchased by glass plant 150.

Glass plant 150 can make payment to broker 210. Broker 210 profit is equal (or approximately equal) to the difference between the purchase price paid by glass plant 150 to broker 210, and what broker 210 paid to MRF 130 or beneficiator 140.

In another embodiment, glass plant 150 may send payment for the C3MC to MRF 130 or beneficiator 140, and transmit a fee to broker 210. MRF 130, beneficiator 140 and/or glass plant 150 may also be charged on a per-use basis, or other licensing fee arrangement such as a fixed upfront fee for a time period (e.g., $100/month). MRFs 130, beneficiators 140 and glass plants 150 may also be offered a promotional deal, such as three months of free unlimited usage, as part of a longer term license agreement. Broker 210 may also receive payment in accordance with, for example, a tiered pricing structure in which the price per use decreases with increasing use.

Transactions module 210 may also record and/or manage data pertaining to establishing new contracts between broker 210 and MRF 130, between broker 210 and beneficiary 140, and/or between broker 210 and glass plant 150. For example, geographic location information, average daily cullet uses (tons/day), average daily cullet production (tons/day), and periodic cullet requirements (e.g., tons/month) may be stored, as applicable, in database 240 for MRF 130, beneficiator 140 and/or glass plant 150.

Logistics module 230 contains logistical information relating to MRF 130, beneficiator 140, and/or glass plant 150. For example, logistics module 230 determines which beneficiator 140 with an available C3MC supply is closest to a glass plant 150 that needs C3MC. Standard operations research algorithms may be used to make such determination(s), while taking into account additional considerations. For example, logistics module 230 may utilize standard techniques pertaining to determining the shortest Hamiltonian circuit or cycle in a graph, also known as "the Traveling Salesman Problem" (TSP). The TSP involves finding the least cost tour through a set of nodes (e.g., customer sites) so that each node is visited exactly once. Either exact algorithms using, for example, branch-and-bound or branch-and-cut techniques, or approximate algorithms that may include, for example, a nearest neighbor heuristic, various insertion methods, improvement methods based on arc or edge exchanges, and composite heuristics may be utilized.

Also be way of example, logistics module 230 may also utilize classical and modern heuristic approaches in solving the "Vehicle Routing Problem" (VRP). In the VRP, the problem is to route a fixed number of vehicles through a number of demand locations (e.g., MRFs 130, beneficiators 140 and/or glass plant 150) such that the total cost of travel is minimized and vehicle capacity constraints are not violated. Classical approaches may include the savings algorithm, the sweep method, set partitioning techniques, the Fisher and Jaikumar algorithm, and/or various improvement schemes. Modern approaches are often called metaheuristics, and may include simulated annealing and/or tabu search. Variations of the VRP may also be utilized, including time windows for delivery and pick up, stochastic demand, and multiple depots with each vehicle assigned to a particular depot.

Logistics module 230 may also utilize constrained shortest path problem (SPP) techniques. The SPP problem consists of finding the least cost route between any two specified nodes in a network whose nodes can only be visited within a specified time interval. Logistics module 230 may also utilize other known techniques and/or algorithms to address particular situations.

One or more embodiments of the present invention advantageously provide several potential transportation benefits vis-à-vis conventional recycling systems and technology. For example, because beneficiator 140 can process C3MC, MRF 130 can send a glass supply of any color combination to beneficiator 140, which previously may have had the capability to process, for example, only one or two specific colors of glass (e.g., flint and amber). Accordingly, one or more embodiments of the present invention, logistics module 230 does not need to typically consider scenarios in which MRF 130 may, for example, have had to ship flint and amber glass to one beneficiator 140, and ship green and mixed glass and/or cullet to a second beneficiator 140 having suitable optical sort capabilities. Similarly, beneficiators 140 can now ship any color glass and/or cullet, as well as any combination(s) of mixed color glass and/or cullet, to glass plant 150, thus simplifying transportation logistics and supply issues of glass plant 150 having to receive one or more specific colors of glass and/or cullet from one or more beneficiators 140 that would be able to fill such an order.

FIG. 3, generally at 300, is an exemplary screen display in accordance with the present invention that allows, for example, glass plant 150 to search for cullet or C3MC using various search criteria. Using, for example, a standard mouse to click on Sale Price 302, the user can be taken to a display such as shown in FIG. 4 that allows the user to search for the Most Expensive 402 single color cullet or C3MC (by, e.g., price/ton), the Least Expensive 404 C3MC, and/or a specified Price/Ton 406 or range of Price/Ton.

If a user clicks on Seller 304 (FIG. 3), the user can be taken to a display such as shown in FIG. 5 that allows the user to search for a seller of, for example, single color cullet (e.g., flint, green or amber) or C3MC by Name 502 or Location 504. In other embodiments of the invention, other colors of cullet can also be searched. In addition, a particular percent of two-color, 3CMC, four-color cullet, etc. can be searched (e.g., 70% flint, 30% amber; 70% flint, 30% anything; 40% flint, 30% green, 30% amber, etc.). If the user clicks on Location 306 (FIG. 3) or Location 504 (FIG. 5), the user may be taken to a display such as shown in FIG. 6, which allows a user to search for cullet as described above (e.g., one or more colors of cullet, optionally including a percent of each color cullet) within a specified number of miles 602 of a user-specified address 604, city 606, state 608 and zip 610.

If a user clicks on Delivery Date 308 (FIG. 3), the user can be taken to a display such as shown in FIG. 7 that allows the user to search for single color cullet or C3MC that is available for delivery on a certain date 702. A user can also specify a range of dates by clicking on fields 704, 706. FIGS. 3-7 can be used both by broker 210 and glass plant 150, depending on whether glass plant 150 purchases directly from MRF 130 and/or beneficiator 140, or utilizes broker 210 to secure the supply of C3MC for glass plant 150.

FIG. 8, generally at 800, is an exemplary screen display in accordance with the present invention that allows a seller, such as MRF 130 and/or beneficiator 140, to post inventory with broker 210. Inventory can be posted, for example, by Quantity 802, Quality 804, and/or a date or range of dates 806 for which the C3MC would be available for pickup.

FIG. 9, generally at 900, is an exemplary screen display in accordance with the present invention that allows a user to search for contracts to which they are a party. FIG. 9 can be utilized by MRF 130, beneficiator 140, glass plant 150 and broker 210. By clicking on a link 902a corresponding to Order No. 9621, a user may be taken to a display such as shown in FIG. 10. As shown in the header section 1001 of FIG. 10, Order No. 9621 corresponds to Order No. 9621 shown in FIG. 9 at 902a. Displayed information pertaining to a particular order can include the Seller 1004 name, the Quantity 1006 and Quality 1008 of C3MC purchased, the Delivery Address 1010, the Date or range of Date(s) 1012 on which the C3MC may be delivered, and whether the delivery is Free on Board (FOB) FOB Seller 1014 or FOB Buyer 1016. As used herein, the quantity of cullet will generally included a weight of cullet desired to be purchased (e.g., 10 tons). The quantity of cullet can also include, as described above, one or more colors of cullet, optionally including a percent of each respective color cullet. As used herein, the quality of cullet refers to the percent cullet by, for example, weight. Therefore, a load of 100 pounds, of which 95 pounds is cullet, and 5 pounds is not cullet (e.g., is paper and/or other contaminants) is 95% quality cullet. The contract Amount 1018, Status Information 1020 and Tracking Information 1022 can also be viewed for a given order number.

Figure 11:
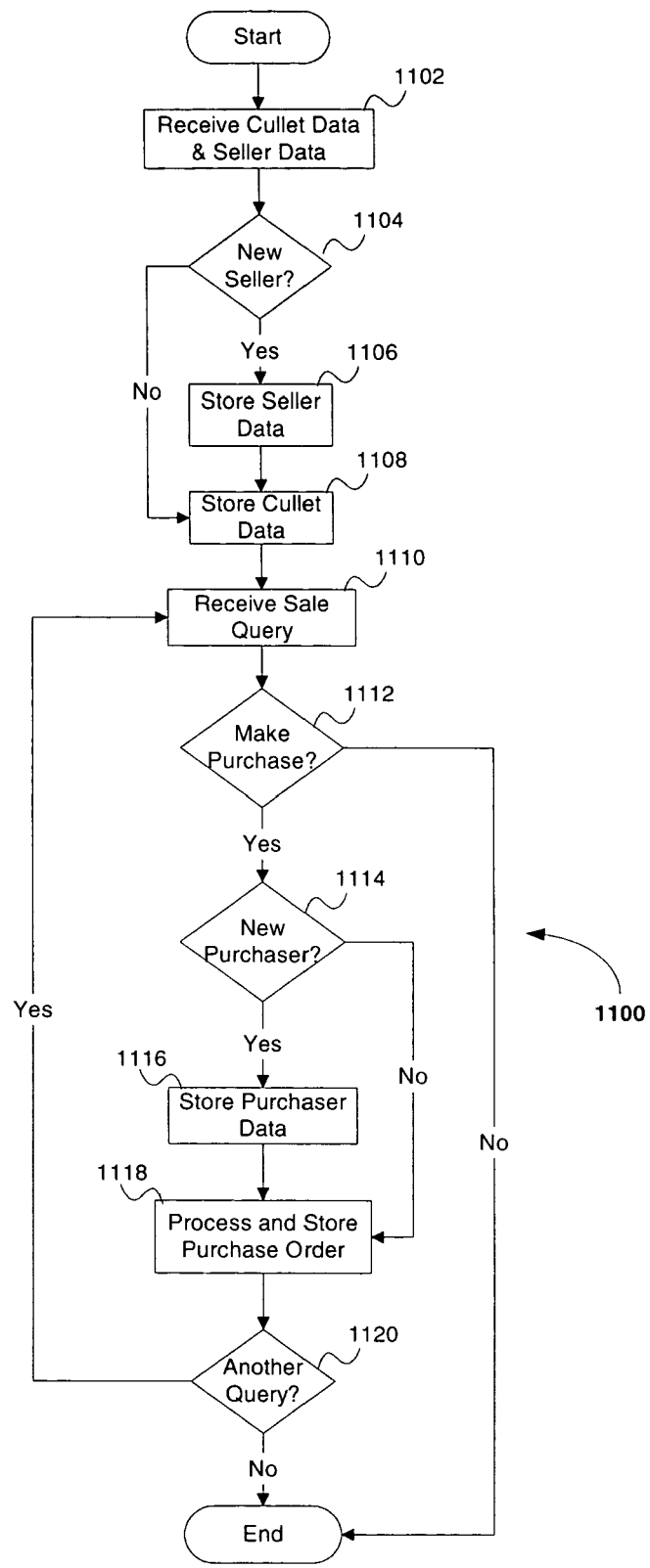
FIG. 11 is a flow diagram in accordance with an exemplary embodiment of the present invention.

FIG. 11, generally at 1100, shows an exemplary method in accordance with an embodiment of the present invention. At step 1102, broker 210 receives data pertaining to C3MC data that may be entered in to broker 210 by, for example, a MRF 130 and/or beneficiator 140. For example, MRF 130 or beneficiator 140 may use a display such as shown in FIG. 8 to provide such data to broker 210.

At decision step 1104, broker 210 determines if the seller is a new seller (e.g., a seller that is not registered with broker 210). If the seller is new, broker 210 stores the seller data at step 1106, and the C3MC data (e.g., as shown at 1004) at step 1108. If the seller has previously been registered with broker 210, then, at step 1108, broker 210 can associate the cullet data with the corresponding seller data that is already on file with broker 210 (e.g., as shown in FIG. 10).

At step 1110, broker 210 receives a sale inquiry. Glass plant 150 may use displays such as shown in FIGS. 3-7 to query broker 210. At decision step 1112, the user decides whether to make a purchase. If a purchase is not made, the process ends. If a purchase is made, then, at decision step 1114, broker 210 determines if the purchaser is a new (i.e., first time) purchaser. If the purchaser is a new purchaser, at step 1116 broker 210 stores the purchaser data such as, for example, name, address, and telephone number, the capacity of the purchaser's glass plant 150, and other information that may facilitate the relationship between broker 210 and glass plant 150. If the purchaser has previously been registered with broker 210, then, at step 1118, broker 210 processes and stores the purchase order.

At decision step 1120, the process returns to step 1110 if another query is desired. If no additional queries are performed, the process terminates.

Figure 12:
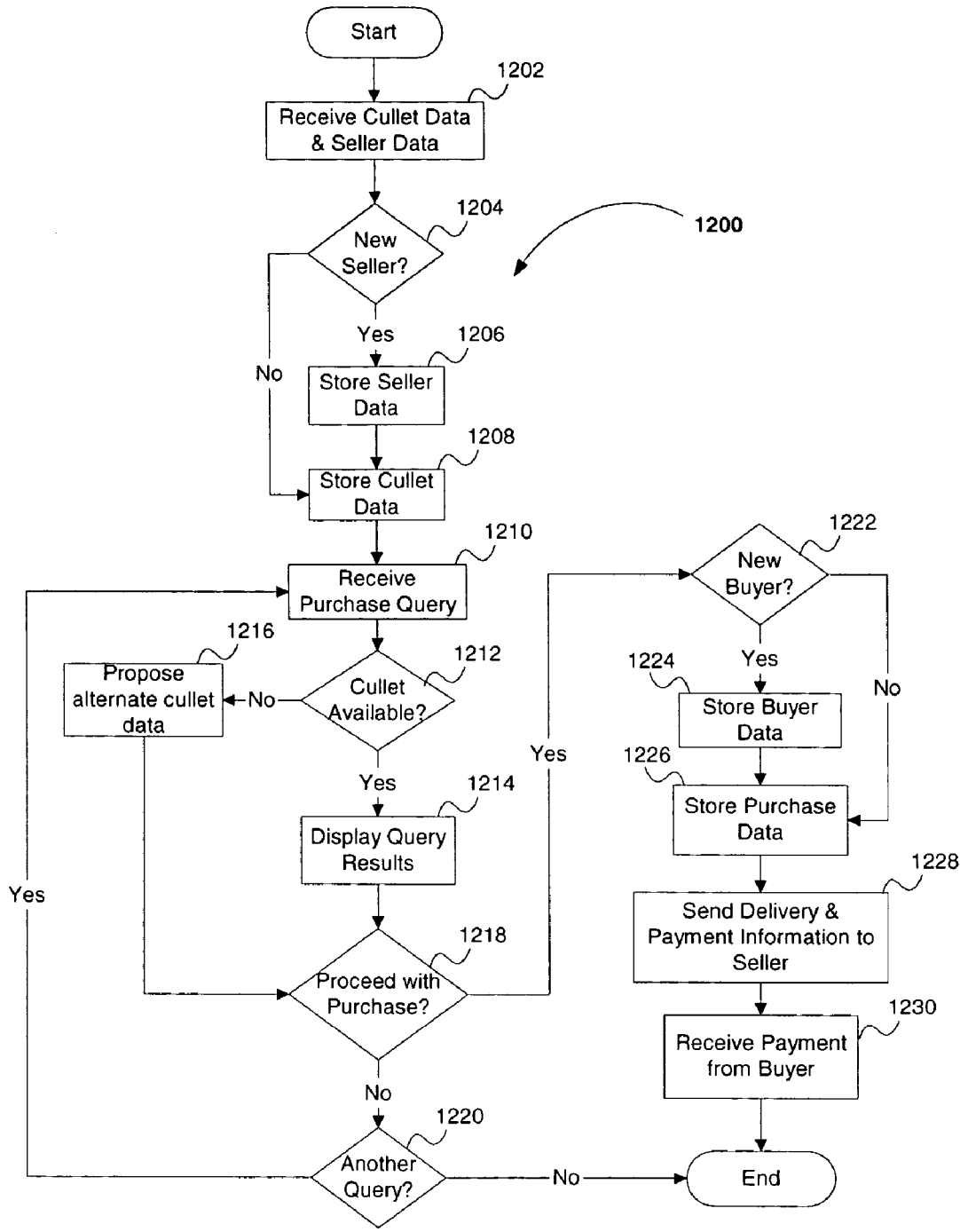
FIG. 12 is a second flow diagram in accordance with an exemplary embodiment of the present invention.

FIG. 12, generally at 1200, shows an exemplary method in accordance with the present invention. At step 1202, broker 210 receives data pertaining to C3MC, that may be entered in to broker 210 by MRF 130 and/or beneficiator 140. For example, MRF 130 or beneficiator 140 may use a display such as shown in FIG. 8 to initiate the process of providing data to broker 210.

At decision step 1204, broker 210 determines if the seller is a new seller (e.g., a seller that is not registered with broker 210). If the seller is new, then, at step 1206, broker 210 stores the seller data, and the C3MC data at step 1208. If the seller has previously been registered with broker 210, then, at step 1208, broker 210 can associate the cullet data with the corresponding seller data that is already on file with broker 210.

At step 1210, broker 210 receives a purchase query from a potential buyer. Glass plant 150 may use displays such as shown in FIGS. 4-8 to query broker 210. At decision step 1212, broker 210 checks data repository 240 to verify the availability of cullet requested by the buyer. If cullet data is available, then, at step 1214, the query results are displayed to the potential buyer. If requested cullet data is not available, then, at step 1216, cullet data that closely matches the request is displayed to the potential buyer.

At decision step 1218, the user decides whether to proceed with the purchase. If a purchase is made, then, at decision step 1222, broker 210 determines if the purchaser is a new (i.e., first time) purchaser. If the purchaser is a new purchaser, at step 1224 broker 210 stores the purchaser data such as, for example, name, address, and telephone number, the capacity of the purchaser's glass plant 150, and/or other information that may facilitate the relationship between broker 210 and glass plant 150. If the purchaser is already registered with broker 210, then, at step 1226, broker 210 stores the purchase order. At step 1228, broker 210 sends delivery and payment information to seller. At step 1230, broker 210 receives payment from buyer.

If a purchase is not made at decision step 1218, and another purchase query is desired, then the process returns to step 1210. If no additional queries are desired at step 1220, the process terminates.

Having thus described our invention, what we claim as new and desire to secure by Letters Patent is as follows:

1. A computer implemented and user-assisted method of brokering a purchase and sale of glass cullet, comprising the steps of:
    storing, with a broker, cullet data accessible by a first computer comprising at least one of a quantity and price of cullet for sale from a plurality of sellers;
    receiving, from a buyer using a second computer, a query at the first computer pertaining to a purchase of a quantity and price of cullet within a specified distance of a buyer specified address;
    querying a data repository associated with the first computer to determine if a stored quantity, purchase price, and location of cullet satisfies the query;
    generating by the first computer, responsive to the query, at least one name of a seller that can provide a quantity and price of cullet in accordance with the query;
    receiving by the broker payment for the purchase of the seller provided cullet; and
    determining by the first computer a least cost shipping route from a location of the seller provided cullet to the buyer specified address.

2. The method according to claim 1, wherein the quantity of cullet for sale comprises a range.

3. The method according to claim 1, wherein the price of cullet for sale comprises a range.

4. The method according to claim 1, wherein the buyer inquiry comprises a cullet price range.

5. The method according to claim 1, wherein the buyer inquiry comprises a cullet quantity range.

6. The method according to claim 1, further comprising the step of the broker providing the seller name to the buyer.

7. The method according to claim 1, further comprising the step of making payment to the seller.

8. The method according to claim 7, wherein the payment is made from the broker to the seller.

9. The method according to claim 1, wherein the data repository comprises data comprising at least one of a buyer's name, address, and telephone number.

10. The method according to claim 1, further comprising the steps of:
    determining if the buyer is registered; and
    if the buyer is not registered, storing buyer data comprising at least one of buyer name and address.

11. The method according to claim 1, further comprising the step of displaying, responsive to the querying step, cullet data purchase results that do not exactly match the query.

12. The method according to claim 11, wherein the displayed cullet data further comprises at least one of a price per ton, a seller name, a seller location, a quantity in tons, a percent flint, a delivery date, and a pickup date.

13. The method according to claim 1, wherein the cullet data further comprises at least one of a price per ton, a seller name, a seller location, a quantity in tons, a percent flint, a delivery date, and a pickup date.

14. The method according to claim 1, wherein the cullet comprises at least two colored mixed cullet.

15. The method according to claim 14, wherein the cullet comprises green glass and amber glass.

16. The method according to claim 14, wherein the cullet comprises green glass and flint glass.

17. The method according to claim 14, wherein the cullet comprises flint glass and amber glass.

18. The method according to claim 1, wherein the cullet comprises green glass, amber glass, and flint glass.

19. A system for brokering a purchase and sale of glass cullet over a computer network, comprising:
   a first computer for storing, with a broker, data pertaining to available cullet for sale from a plurality of sellers;
   the first computer receiving a cullet purchase inquiry from a buyer, comprising a quantity and price of cullet within a specified distance of a buyer specified address;
   the first computer generating, using the stored cullet data and responsive to the received cullet purchase inquiry, at least one name of a seller that can provide a quantity and price of cullet within the specified distance that satisfies the received cullet purchase inquiry;
   the first computer receiving, with the broker, payment for the purchase of the seller provided cullet; and
   the first computer determining a least cost shipping route from a location of the seller provided cullet within the specified distance to the buyer specified address.

20. The system according to claim 19, wherein the quantity of cullet for sale comprises a range.

21. The system according to claim 19, wherein the price of cullet for sale comprises a range.

22. The system according to claim 19, wherein the buyer inquiry comprises a cullet price range.

23. The system according to claim 19, wherein the buyer inquiry comprises a cullet quantity range.

24. The system according to claim 19, wherein the first computer causes displaying, responsive to querying a data repository, on a second computer, cullet data that closely matches the inquiry.

25. The system according to claim 19, wherein the first computer causes displaying, responsive to querying a data repository, on a second computer, cullet data that matches the inquiry.

26. A computer program product residing on a computer readable medium, the computer program product comprising instructions for causing a computer to:
   store, with a broker, data pertaining to a quantity and price of cullet for sale from a plurality of sellers;
   query a data repository to determine if a stored quantity and price of cullet satisfies a buyer inquiry pertaining to a purchase of a quantity and price of cullet within a specified distance of a buyer specified address that satisfies the buyer inquiry;
   generate, responsive to the inquiry, at least one name of a seller that can provide a quantity and price of cullet within the specified distance that satisfies the buyer inquiry;
   receive, by a broker, payment for the purchase of the seller provided cullet; and
   determine a least cost shipping route from a location of the seller provided cullet to the buyer specified address.

27. The computer program product according to claim 26, wherein the quantity of cullet for sale comprises a range.

28. The computer program product according to claim 26, wherein the price of cullet for sale comprises a range.

29. The computer program product according to claim 26, wherein the buyer query comprises a cullet price range.

30. The computer program product according to claim 26, wherein the buyer inquiry comprises a cullet quantity range.

31. The computer program product according to claim 26, further comprising instructions for causing a computer to:
   receive at least one of payment and payment data from the buyer; and
   transmit at least one of payment and payment data to the seller.

32. The method of claim 1, further comprising determining a seller location having available cullet for sale that is closest to a buyer location for receiving cullet.

33. The system of claim 19, wherein the first computer is further configured to determine a seller location having available cullet for sale that is closest to a buyer location for receiving cullet.

34. The computer program product of claim 26, further comprising instructions for causing a computer to determine a seller location having available cullet for sale that is closest to a buyer location for receiving cullet.

* * * * *